(No Model.)

F. RHIND.
BLOWING LAMP BOWLS.

No. 246,204.  Patented Aug. 23, 1881.

Witnesses.
Wm. H. Mortimer.
Wm. A. Kern.

Inventor.
Frank Rhind,
per
F. A. Lehmann,
Atty.

UNITED STATES PATENT OFFICE.

FRANK RHIND, OF BROOKLYN, NEW YORK.

BLOWING LAMP-BOWLS.

SPECIFICATION forming part of Letters Patent No. 246,204, dated August 23, 1881.

Application filed January 31, 1881. (No model.)

*To all whom it may concern:*

Be it known that I, FRANK RHIND, of Brooklyn, in the county of Kings and State of New York, have invented certain new and useful Improvements in Blowing Lamp-Bowls; and I do hereby declare the following to be a full, clear, and exact description of the invention, such as will enable others skilled in the art to which it pertains to make and use it, reference being had to the accompanying drawings, which form part of this specification.

My invention relates to an improvement in lamp-bowls and the molds for making them; and it consists, first, in a lamp-bowl having the filling-tube depressed so that its upper end will be about flush with the top of the bowl, and thus not be in the way of the handle of the ratchets when the burner is being screwed and unscrewed; second, the mold in which the bowl is blown, provided with a movable plug or piece in its top, the lower end of the plug serving to depress the filler-tube to any desired degree below the top; third, in a guard which prevents the glass from moving over into the crease or joint between the two parts of the mold, all of which will be more fully described hereinafter.

Figure 1:
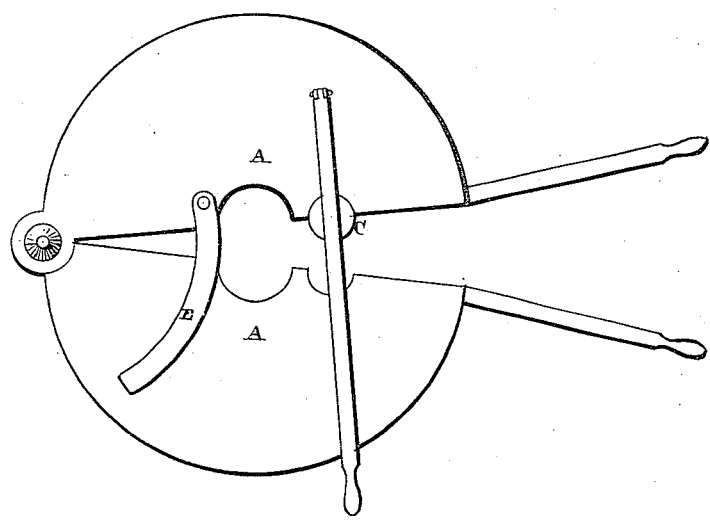
Figure 2:
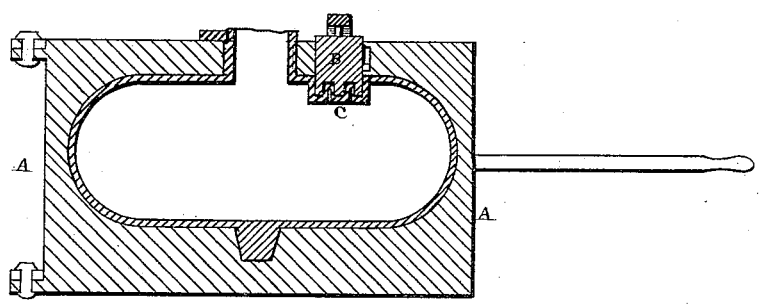
Figure 3:
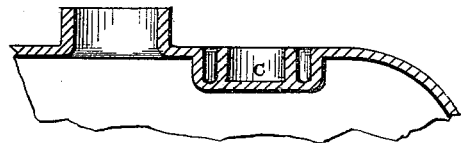

Figure 1 is a plan view of the molds. Fig. 2 is a vertical section of the same. Fig. 3 is an enlarged section detail view of the bowls alone.

A represents an ordinary glass-mold, which is provided with a removable part or plug, B, which passes down through its top, and which has its lower end shaped as shown. The glass is introduced into the mold and the bowl is blown in the usual manner, the glass forming around the lower end of this removable plug, as shown in Fig. 2. Before the mold can be opened this plug must be withdrawn, so that its lower end will not project into the inside of the mold, and then the mold is opened and the bowl removed, the filler-tube C being closed at or near its bottom by a film of glass, which is removed by any sharp-pointed instrument. In practice this filler-tube will be depressed, so that its upper end is only about level with the top of the bowl, and then when the usual screw-cap is applied thereto the cap will extend so little above the top of the bowl that it will not be in the way of the handle of the ratchet for raising the wick when the burner is being removed from or placed in position upon the collar of the lamp.

If so desired, the metallic caps which are usually placed upon the top of the lamps, for the purpose of giving them a finished appearance, may have the filler-tube made directly through them, and the cap, when screwed upon this filler-tube, will project so slightly above the top of the bowl as not to be in the way when the burner is being removed or replaced.

Where the filler-tube is not depressed, as here shown, either a very high collar has to be used, or else a ring is formed upon the top of the tube, so as to raise the cap upward high enough to allow the handle of the ratchet to pass over the top of the cap upon the filler-tube. By means of my invention only the ordinary collar is necessary, and the burner then sits down solidly upon the top of the bowl, making the height of the lamp considerably less, and thus decreasing the liability of being tipped over. Another great advantage gained by depressing the filler-tube is that the light is brought so much nearer to the oil, and thus a more brilliant light is obtained.

Where the plug which forms the filler-tube is used upon the joint or crease where the two parts of the mold open the blower constantly moves the glass over into the crease on the side of the central opening toward the hinges, and in order to prevent this a curved guard, E, is used. This guard is fastened upon the top of one half of the mold, and extends past the corner of the crease in the other part of the mold and prevents the glass from being moved over in the crease, and thus forming a ridge upon the side of the neck of the bowl.

In order to prevent a ridge being formed upon the side of the neck, in case the quantity of glass should be too large, the mold is usually opened and the partially-blown bowl is turned around several times in the mold, so as to move the ridge which was formed into different places, and thus destroy it as much as possible. This guard prevents a ridge from being formed under any circumstances.

I am aware that a mere depression has been made in the top of the lamp-bowl, and this I disclaim. My invention consists in blowing a depressed tube upon which a screw-collar is to be placed.

Having thus described my invention, I claim—

1. As a new article of manufacture, a blown-glass lamp-bowl having a depressed filler-tube blown in its top to one side of the neck, substantially as described.

2. A glass-mold provided with a vertically-movable plug, B, having its lower end shaped as shown, the plug being placed to one side of the center of the mold, whereby a depressed filler-tube is blown upon the lamp-bowl, substantially as specified.

3. A glass-mold provided with a curved guard for preventing a ridge from being formed upon the neck of the bowl, substantially as set forth.

In testimony that I claim the foregoing I have hereunto set my hand this 28th day of January, 1881.

FRANK RHIND.

Witnesses:
F. A. LEHMANN,
A. C. KISKADDEN.